July 30, 1957     C. W. BLACKBURN     2,800,734
STORM FIN FOR SIGNS
Filed Nov. 28, 1956
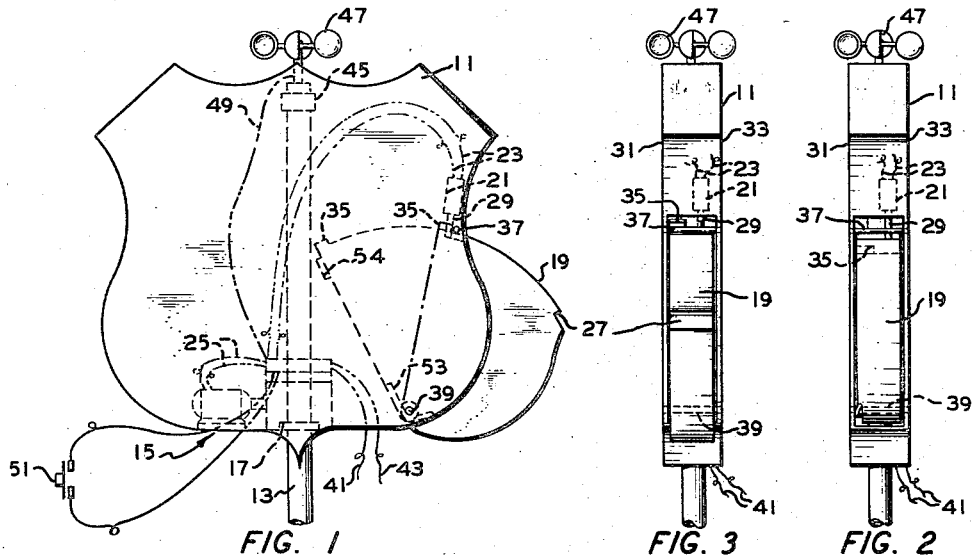
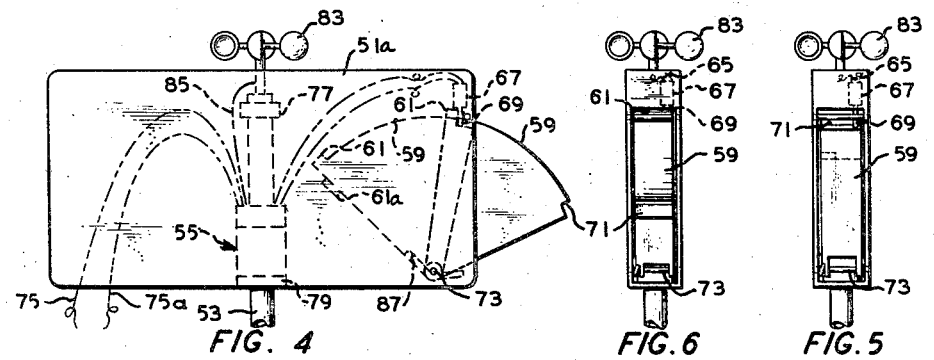
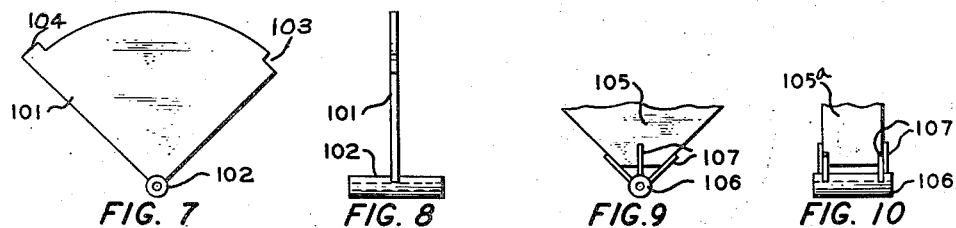
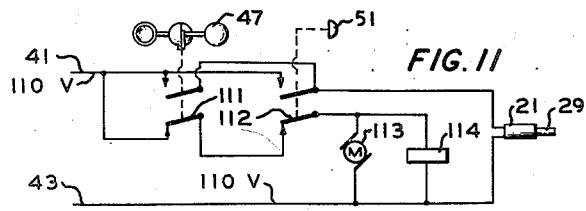
INVENTOR.
C. W. BLACKBURN
BY *Hudson E. Young*
ATTORNEYS United States Patent Office 2,800,734
Patented July 30, 1957

2,800,734
STORM FIN FOR SIGNS

Charles W. Blackburn, Bartlesville, Okla., assignor to Phillips Petroleum Company, a corporation of Delaware Application November 28, 1956, Serial No. 624,894

15 Claims. (Cl. 40—125)

This invention relates to signs exposed to atmospheric wind loads. In one aspect it relates to means for unloading wind loads from large signs so as to eliminate necessity for super-strong signs and sign supports. In another aspect it relates to large signs provided with fins for quick release from the sign and release of the sign to rotate so that the assembly acts as a weather vane thereby unloading high wind pressure.

An object of this invention is to provide means for avoiding the necessity for super-strong signs and sign supports by incorporating means for unloading high wind loads from large signs.

Another object of this invention is to provide means for unloading high wind loads from large signs so that the signs and their supports can be manufactured and installed at less cost than heretofore.

Still another object of this invention is to provide means for unloading wind loads from signs and releasing the signs to rotate around their supports so that the assembly acts substantially as a weather vane.

Yet other objects and advantages of this invention will be realized by reading the following description which, taken with the attached drawing, forms a part of this specification.

In the drawing, Figure 1 illustrates an elevational view, in diagrammatic form, of one embodiment of a rotating sign employing the wind unloading apparatus of my invention.

Figure 2 is a side view of the apparatus of Figure 1 with the wind unloading apparatus retracted into the sign in an inoperative position.

Figure 3 is a side view of the same sign with the wind unloading apparatus opened from the sign in its operative position.

Figure 4 illustrates, in diagrammatic form, an elevational view of a nonrotating sign embodying the wind unloading apparatus of my invention.

Figure 5 is a side view of the apparatus of Figure 4 with the wind unloading apparatus in its inoperative position within the sign.

Figure 6 is the same view of Figure 4 with the wind unloading apparatus in its operative position.

Figure 7 is a side view of another embodiment of my invention.

Figure 8 is an end view of the apparatus of Figure 7.

Figure 9 is a side view illustrating a support for the wind loading apparatus of my invention.

Figure 10 is an end view of the appartus of Figure 9.

Figure 11 illustrates a wiring diagram for the electrical operating apparatus of my invention.

Broadly speaking, my invention involves a fin or large plate which is normally retained in close proximity to one side of a large sign with the plate or fin being pivoted to rotate away from the sign when released so as to increase the area of the sign assembly on one side of the sign support and to release the sign so that it can rotate around its support, the entire assembly acting as a weather vane thereby unloading high wind pressure.

It is intended that in one embodiment a wind pressure or velocity determining means such as an anemometer be employed for continuously determining wind velocity and when the anemometer indicates a predetermined high wind velocity, the apparatus is operated to release the sign rotatably with respect to its support and to release the fin so that the sign rotates and points into the wind as a weather vane. Specifically my invention includes a sign board assembly comprising, in combination, a sign board, a vertically disposed pivot supporting said board rotatably along its vertical axis, a fin, a pivot fixed to said assembly supporting said fin, said fin in its inoperable position being retained adjacent said board in such a manner that the areas of said assembly on opposite sides of said vertically disposed pivot exposed to wind load are mutually equal, said fin being adapted to rotate around its pivot in such a manner as to increase the area of said assembly on the fin side of said vertically disposed pivot.

Extra strong signs and sign supports are uneconomical for several reasons. First, the first costs and maintenance costs are higher than with signs structurally less strong; second, the actual need for extra strength is only very occasional.

The storm fin of my invention is, in one case, a single plate of metal or plastic material pivoted at its bottom so that when released it falls out and down and away from the sign. A spring is, in some cases, placed at the pivot point to assist in making certain that the fin operates when it is released. The release is accomplished by means of energizing a solenoid, the armature of which rests against a catch on the fin. When the solenoid is energized and its armature moves away from the catch on the fin, the fin is released and falls into its operative position. If desired, the solenoid can be energized by operating a push button at a remote point in case it is desired not to employ an automatically operating anemometer assembly. Either the anemometer or the remote control switch actuates a limit switch which releases the fin and at the same time disconnects, for example, a stationary sign from its support so that it rotates or declutches a rotating sign to a free-wheeling condition so that it also rotates, and points into the wind.

For the sake of economy, since the actual operation of such apparatus is only occasional, resetting of the fin is preferably accomplished manually. Upon operation of the remote control switch or anemometer once the circuit is closed to cause the sign to rotate freely or to declutch a rotating sign, these circuits stay closed for continued free rotation of the sign until such time as an operator desires to return the sign to its normal condition. The shape of the vane is ordinarily so arranged as to fit the contour of the sign when in its normal position and to avoid interference with the internal parts and structural members of the sign.

In another embodiment in which signs are so constructed as to contain advertising matter on both faces, the two faces of the sign are ordinarily positioned some distance apart and the fin and other operating apparatus are disposed inside the sign for several reasons. First, to be out of sight; and, second, for protection against the weather. In the case of double faced signs, it is preferable to construct the fin with a pair of parallel side walls disposed some distance apart so that each side wall is in a plane parallel to and very close to the plane of one of the faces of the sign.

Referring now to the drawing as indicated in Figures 1, 2 and 3, reference numeral 11 identifies a sign of the rotating type. The two faces of the sign are identified by reference numerals 31 and 33 (Figures 2 and 3). Disposed between these faces is a vane or fin 19. The dotted outline of fin 19 in Figure 1 illustrates its position when wholly within the sign in its inoperative position. The fin is pivoted at pivot 39 around which it rotates. When the fin is within the sign, it is held by an armature 29 of a solenoid 21. This armature extends into a groove 27. A stop or lug 54 prevents the fin from being rotated into the sign too far, as indicated. Upon release of the fin by operation of the solenoid 21, a spring 53 assists the fin 19 in rotating out of the sign into its operative position. A lug or stop 35 contacts a stop rod or corresponding lug 37 attached to at least one side of the sign to prevent the fin from rotating too far. In the embodiment of Figure 1, which illustrates a rotating sign, reference numeral 15 identifies an electric motor-rotating and clutch assembly. This assembly includes a rotating mechanism which rotates the sign around its support. The sign is attached rotatably to support post 13 by at least a pair of bearings 17 and 45. The assembly 15 also contains, for example, a magnetic clutch of such nature that upon de-energizing it throws the rotating portion of the assembly out of gear so that the sign can rotate freely around post 13. A pair of wires 23 conducts electric current from assembly 15 for operation of the solenoid 21. Also a pair of wires 25 conducts electric current to the motor of the assembly. Wires 41 and 43 conduct electric current from a source, not shown, to the sign for its operation.

In order to declutch the clutch so that the sign will rotate freely, an anemometer 47 is illustrated as being positioned on the top of the sign. This anemometer is connected by a flexible conduit 49 to the assembly 15 which is provided with a limit switch. This limit switch is so adjusted that, for example, it operates the magnetic clutch and throws out the clutch and then closes the circuit 23 to the solenoid when the anemometer indicates a wind velocity of, for example, 50 miles per hour.

In case it is desired, a push button arrangement can be used in place of the anemometer. Such a push button is illustrated in Figures 1 and 11 and is identified by reference numeral 51. In this case when an attendant or operator desires, the apparatus can be operated merely by pushing the push button located within a building or at any desirable location remote from the sign at such time that he believes the wind velocity is sufficiently high that the wind load of the sign should be unloaded.

Figures 4, 5, and 6 illustrate a normally nonrotatable type sign, that is, one which is normally rigidly attached to a support. According to my invention, however, this type of sign also is attached to a support by means of bearings so that when the occasion arises, it can rotate freely around its support. Reference numeral 51a identifies such a sign and this sign is supported by support post 53. Bearings 77 and 79 attach the sign rotatably to support post 53. Reference numeral 55 identifies a magnetic cutout mechanism which is so constructed that upon being energized electrically a key or other piece of apparatus is removed from a slot in post 53 so as to free the sign rotatably from the post. Electric current for operating such an apparatus is provided through lead wires 75 and 75a. This assembly is also provided with a fin 59 of the same general construction as the fin illustrated in Figure 1. Slot 71 on fin 59 is provided for accommodation of an armature 69 of a solenoid 67 for retaining the fin in place within the sign. The sign illustrated in Figures 4, 5, and 6 is also a double walled sign similar to that illustrated in Figures 1, 2, and 3. Lug 61 is provided for preventing the fin from rotating too far when the solenoid is operated. Fin 59 rotates around pivot 73 and upon release of the armature 69 from slot 71, a spring 87 assists in starting movement of the fin. Lug 61a prevents the fin from entering the sign too far when being reset.

To operate this embodiment of my sign I have also provided an anemometer 83 which is operatively attached to the magnetic cutout mechanism 55 by a flexible lead or cable 85. This assembly is also provided with a limit switch which is set to operate at a predetermined wind velocity in the same manner as described relative to Figure 1.

While not illustrated relative to Figure 4, this assembly, when desired, can also be operated by a remotely positioned push button similar to the push button described hereinbefore relative to Figure 1.

Figures 7 and 8 illustrate a fin 101 which is constructed of a single plate and such a plate is provided with a slot 103 for accommodation of a solenoid armature, and it is provided with a lug 104 for stopping its rotation. This fin is provided with a bearing 102 which is adapted for support by a rod disposed through a central opening of the bearing.

Figures 9 and 10 illustrate, diagrammatically, one method of attachment of a bearing 106 to a double-walled fin such as that illustrated in Figures 1 to 6. In Figures 9 and 10 the walls of the fin are illustrated as being side plates 105 and end plates 105a. In place of extending these plates all the way to bearing 106 I have illustrated the bearing as being attached to the plates by such material as angle irons or braces 107.

Figure 11 illustrates, in diagrammatic form, an electrical wiring diagram for operating such an assembly as illustrated in Figures 1 to 3. In Figure 11 a pair of wires 41 and 43 conduct electric current from a source, not shown, to the apparatus. Lead wire 41 is connected to corresponding terminals of limit switches 111 and 112. The limit switch 111 is connected with anemometer 47 while push button switch 112 is connected with push button 51. Limit switch 111, as mentioned hereinbefore, becomes operative to open the circuits through motor 113 and magnetic clutch 114 and to close the circuit flowing through solenoid 21 to actuate armature 29 when the wind velocity reaches a predetermined velocity, such as 50 miles per hour. When the velocity reaches a predetermined velocity and the limit switch 111 operates as just mentioned, the limit switch remains in this position until such a time as an operator resets it to its original position to permit current to flow through motor 113 and clutch 114 thereby opening the circuit through solenoid 21.

The push button 51 operates in the same manner, that is, upon pushing the button switch 112 opens and stops the current flowing through motor 113 and clutch 114 and closes the circuit through solenoid 21 until such time as the operator resets the apparatus to its original normal condition.

While the wind unloading apparatus of my invention may be more useful when applied to rotating signs, it, however, is equally applicable to nonrotating signs, that is, those which are constructed and arranged in a specific rigid position. Such signs with wind unloading apparatus are particularly useful in areas which occasionally are traversed by high winds such as hurricanes, tornados, and the like.

In order to protect the internal equipment of the sign from elements of the weather, bugs, birds and dirt, etc., it is, in many cases, advisable to provide a pocket for accommodation of the fin within the sign, that is, the space provided for the fin has the sides of the sign as protecting the sides of the fin and the edges of the fin can be protected by metal or plastic plates generally conforming with the fin.

While I have mentioned herein, an anemometer-limit switch assembly being set to operate at a wind velocity of 50 miles per hour, this assembly can be set to operate at any desired wind velocity, either above or below 50 miles per hour.

Many signs are as large as 10, 12, or even 20 feet in diameter, and such signs, according to prior art must be strongly constructed and supported in areas subject to high wind velocities. My invention has the advantage that when applied to a sign, the sign and its support can be constructed for considerably less cost than such signs and supports when my invention is not used.

While certain embodiments of the invention have been described for illustrative purposes, the invention obviously is not limited thereto.

I claim:

1. A sign board assembly comprising, in combination, a sign board, a vertically disposed pivot supporting said board rotatably along its vertical axis, a fin, a pivot fixed to the rotatable portion of said assembly and supporting said fin, said fin in its inoperable position being retained adjacent said board in such a manner that the areas of said assembly on opposite sides of said vertically disposed pivot exposed to wind load are substantially mutually equal, said fin being adapted to rotate around its pivot in such a manner as to increase the area of said assembly on the fin side of said vertically disposed pivot.

2. A sign board assembly comprising, in combination, a board adapted to accommodate a sign, a vertically disposed pivot supporting said board rotatably along its vertical axis, a fin, a pivot fixed to the rotatable portion of said assembly on one side of said vertically disposed pivot and supporting said fin, said fin being adapted to rotate around its support pivot in a plane parallel to the plane of said board, said fin being adapted to be retained normally adjacent said board in such a manner that the areas of said assembly exposed to wind load on opposite sides of said vertically disposed pivot are substantially mutually equal, first means for detecting a predetermined wind force in the vicinity of said assembly, and second means responsive to said first means to rotate said fin around its pivot in such a manner that the area of the fin side of said assembly exposed to wind load is greater than the area exposed to wind load on the other side of said assembly.

3. A sign board assembly comprising, in combination, a board adapted to accommodate a sign, a support for said board, said board being rotatably attached to said support, means to lock said board nonrotatably to said support, a fin, a pivot fixed to said assembly, said pivot supporting said fin rotatably, the direction of rotation of said fin being in a plane parallel to the plane of said board, said fin being retained normally adjacent said board in such a manner that the areas of said assembly exposed to wind on opposite sides of said support are substantially mutually equal, means for detecting wind force in the vicinity of said assembly, means to unlock said board from said support so that the board is free to rotate, means to rotate said fin around its pivot in a direction away from said support in such a manner that the area of the face of said board and fin exposed to the force of wind on one side of said support is greater than the area of the corresponding face of said board exposed to wind on the opposite side of said support.

4. The sign board assembly of claim 3 wherein said means to rotate said fin is manually actuated.

5. The sign board assembly of claim 3 wherein said means to rotate said fin is actuated in response to a predetermined force of the wind.

6. A sign board assembly comprising, in combination, a board adapted to accommodate a sign, a support for the board, said board being rotatably attached to said support, means to lock said board nonrotatably with respect to said support, a fin, a pivot fixed to the rotatable portion of said assembly, said pivot rotatably supporting said fin, said pivot and said fin being so disposed that the direction of rotation of said fin is in a plane parallel to the plane of said board and away from said support, said fin being positioned in an inoperable position adjacent said board in such a manner that the areas of said assembly exposed to atmospheric wind on opposite sides of said support are substantially mutually equal, first means supported by said board to retain said fin in said inoperative position, second means supported by said board to render inoperative said means to lock said board nonrotatable, and third means operatively attached to said board to render inoperative said first means to retain said fin in said inoperative position whereby said fin is free to rotate around its pivot in a direction away from said support and beyond the edge of said board in such a manner that the area of the face of said board on the fin side of said support and fin exposed to the force of atmospheric wind is greater than the area of said board exposed to atmospheric wind on the other side of said support.

7. The assembly of claim 6 wherein said fin is disposed in such a manner that upon operation of said means to render inoperative said means to retain said fin in said inoperative position, said fin rotates by gravity about its pivot in said direction beyond the edge of said board.

8. In the assembly of claim 6, a spring biasing said fin to rotate in said direction beyond the edge of said board.

9. The assembly of claim 6 wherein said means to render inoperative said means to lock said board nonrotatable and said means to render inoperative said means to retain said fin in its inoperative position are a manually operable electrical contact means.

10. The assembly of claim 6 wherein said means to render inoperative said means to lock said board nonrotatable and said means to render inoperative said means to retain said fin in its inoperative position are electrically operable means responsive to the force of atmospheric wind.

11. A sign board assembly comprising, in combination, a board adapted to accommodate a sign, a vertically disposed pivot supporting said board rotatably along its vertical axis, means including a clutch to rotate said board around said pivot, a fin, a pivot fixed to said assembly and rotatably supporting said fin, said pivot and said fin being so disposed that the direction of rotation of said fin is in a plane parallel to the plane of said board and away from said vertically disposed pivot, said fin being positioned in an inoperative position adjacent said board in such a manner that the areas of said assembly exposed to atmospheric wind on opposite sides of said vertically disposed pivot are substantially mutually equal, means to retain said fin in said inoperative position, means to render inoperative said means to rotate said board and to declutch said clutch thereby making said board freely rotatable and to render inoperable said means to retain said fin in said inoperable position where by said fin is free to rotate around its pivot in a direction away from the vertically disposed support pivot and beyond the edge of said board in such a manner that the area of the face of said board on the fin side of said vertically disposed pivot exposed to the force of atmospheric wind is greater than the area of said board exposed to atmospheric wind on the other side of said vertically disposed pivot.

12. The assembly of claim 11 wherein said fin is disposed in such a manner that upon operation of said means to render inoperative said means to retain said fin in said inoperative position, said fin rotates by gravity about its pivot in said direction beyond the edge of said board.

13. In the assembly of claim 11, a spring biasing said fin to rotate in said direction beyond the edge of said board.

14. The assembly of claim 11 wherein said means to render inoperative said means to lock said board nonrotatable and said means to render inoperative said means to retain said fin in its inoperative position are a manually operable electrical contact means.

15. The assembly of claim 11 wherein said means to render inoperative said means to lock said board nonrotatable and said means to render inoperative said means to retain said fin in its inoperative position are electrically operable means responsive to the force of atmospheric wind.

References Cited in the file of this patent

UNITED STATES PATENTS 2,030,769     Slattengren _____ Feb. 11, 1936

FOREIGN PATENTS 600,793     Germany _____ Oct. 6, 1932